United States Patent [19]

Swarup et al.

[11] Patent Number: 5,703,155

[45] Date of Patent: Dec. 30, 1997

[54] WATERBORNE COATING COMPOSITION HAVING IMPROVED RHEOLOGY CONTROL AND APPEARANCE

[75] Inventors: Shanti Swarup, Allison Park; Richard J. Sadvary, Pittsburgh, both of Pa.

[73] Assignee: PPG Industries, Inc., Pittsburgh, Pa.

[21] Appl. No.: 627,527

[22] Filed: Apr. 4, 1996

Related U.S. Application Data

[63] Continuation-in-part of Ser. No. 356,808, Dec. 15, 1994, Pat. No. 5,506,325.

[51] Int. Cl.$^6$ .............. C08L 31/00; C08F 20/10
[52] U.S. Cl. .................. 524/558; 526/318.4
[58] Field of Search ............. 526/318.4; 524/558

[56] References Cited

U.S. PATENT DOCUMENTS

| | | | |
|---|---|---|---|
| 3,813,254 | 5/1974 | Makhlouf | 117/12 |
| 3,880,796 | 4/1975 | Christenson et al. | 260/33.6 UA |
| 3,919,154 | 11/1975 | Chang et al. | 260/29.4 UA |
| 3,953,644 | 4/1976 | Camelon et al. | 428/220 |
| 3,966,667 | 6/1976 | Sullivan et al. | 260/33.6 UA |
| 4,055,607 | 10/1977 | Sullivan et al. | 260/851 |
| 4,147,679 | 4/1979 | Scriven et al. | 260/29.2 TN |
| 4,147,688 | 4/1979 | Makhlouf et al. | 260/33.6 EP |
| 4,180,489 | 12/1979 | Andrew et al. | 428/402 |
| 4,180,619 | 12/1979 | Makhlouf et al. | 526/202 |
| 4,403,003 | 9/1983 | Backhouse | 427/407.1 |
| 4,411,951 | 10/1983 | Barsotti | 428/328 |
| 4,416,941 | 11/1983 | Barsotti | 428/328 |
| 4,425,450 | 1/1984 | Horvath | 523/334 |
| 4,455,331 | 6/1984 | Barsotti | 428/446 |
| 4,518,724 | 5/1985 | Kuwajima et al. | 523/201 |
| 4,558,075 | 12/1985 | Suss et al. | 523/216 |
| 4,569,966 | 2/1986 | Piccirilli et al. | 524/589 |
| 4,620,993 | 11/1986 | Suss et al. | 427/407.1 |
| 4,624,973 | 11/1986 | Kuwajima et al. | 523/221 |
| 4,764,430 | 8/1988 | Blackburn et al. | 428/413 |
| 4,829,120 | 5/1989 | Yabuta | 524/460 |
| 4,916,187 | 4/1990 | Goel | 528/109 |
| 4,927,868 | 5/1990 | Schimmel et al. | 523/439 |
| 4,965,317 | 10/1990 | Kania et al. | 525/155 |
| 5,025,060 | 6/1991 | Yabuta et al. | |
| 5,071,904 | 12/1991 | Martin et al. | |
| 5,077,347 | 12/1991 | Yabuta et al. | 524/504 |
| 5,098,947 | 3/1992 | Metzger et al. | 524/507 |
| 5,196,485 | 3/1993 | McMonigal et al. | 525/327.3 |

FOREIGN PATENT DOCUMENTS

| | | |
|---|---|---|
| 0 234 881 | 9/1987 | European Pat. Off. . |
| 0 457 939 | 7/1994 | European Pat. Off. . |
| 49-18126 | 2/1974 | Japan . |

*Primary Examiner*—Joseph L. Schofer
*Assistant Examiner*—Nabil Sarofim
*Attorney, Agent, or Firm*—Krisanne Shideler; Kenneth J. Stachel

[57] ABSTRACT

Waterborne coating compositions are provided comprising a polymeric film-forming resin, a non-gelled copolymer and up to about 2.1 percent by weight silica, based on the total weight of resin solids in the coating compositions. The non-gelled copolymer is prepared from about 75 to about 95 percent by weight of an ethylenically unsaturated monomer such as methyl methacrylate, butyl acrylate, butyl methacrylate, styrene, and mixtures thereof; about 2 to about 12 percent by weight of an ethylenically unsaturated monomer having one acid functional group; and about 2 to about 20 percent by weight of an ethylenically unsaturated oligomeric monomer hating a number average molecular weight of about 1500 to about 4000 and which is derived from a hydroxyl functional acid having a predominantly hydrocarbon chain of from about 10 to 19 carbon atoms. Note that the percentages by weight are based upon the total solid weight of reactants used to prepare the copolymer.

The coating compositions may be applied to a substrate alone or as a clear film-forming composition in a color-plus-clear composite coating.

22 Claims, No Drawings

WATERBORNE COATING COMPOSITION HAVING IMPROVED RHEOLOGY CONTROL AND APPEARANCE

This application is a continuation-in-part of U.S. patent application Ser. No. 08/356,808, filed on Dec. 15, 1994 now U.S. Pat. No. 5,506,325.

FIELD OF THE INVENTION

The present invention relates to a novel copolymer and coating compositions containing the copolymer.

BACKGROUND OF THE INVENTION

An ongoing trend in the automotive industry has been to develop coating systems which provide smooth, glossy, mirror-like finishes. Recently, there has also been an effort in the automotive industry to reduce atmospheric pollution due to volatile solvents emitted during the painting process. One approach to this end has been to develop waterborne coating compositions as well as "high solids" coating compositions containing low molecular weight polymeric binders. Unfortunately, many of the high solids coating compositions have a tendency to sag on application and when baked. Such sagging adversely affects the appearance properties of the coating compositions. "Popping" is an additional appearance problem that is often observed in high solids coating compositions, caused by volatile materials evaporating through a coating which has already begun to cure at the surface.

In an attempt to alleviate sag problems, materials such as pyrogenic or fumed silica have been added to high solids coating compositions. Also, as disclosed in EP 0457939 B1, the hydrophobic type silica can be used with a nonionic fluorocarbon polymer bridging agent. However, such materials may not provide adequate popping control and may decrease the distinctness of image in clear coatings. Distinctness of image is the mirror-like quality of a coating system and is directly affected by the smoothness of the coating.

It would be desirable to provide a waterborne coating composition which can be used as either a monocoat or as a clear coat in a color-plus-clear composite coating, containing a low-cost rheology control additive which provides acceptable sag and popping control without adversely affecting other appearance properties.

SUMMARY OF THE INVENTION

The present invention includes waterborne coating compositions comprising a polymeric film-forming resin, a non-gelled copolymer reaction product and up to about 2.1 percent by weight of a hydrophobic amorphous fumed silica, based on the total weight of resin solids in the coating compositions. The non-gelled copolymer reaction product comprises about 75 to about 95 percent by weight of an ethylenically unsaturated unsubstituted or hydroxyl functional aliphatic or aromatic monomer; for example, vinylic monomers such as styrene and alkyl esters of acrylic acid and methacrylic acid with an alkyl group having from about 1 to 17 carbon atoms such as methyl methacrylate, butyl acrylate, and butyl methacrylate, and mixtures thereof; about 2 to about 12 percent by weight of an ethylenically unsaturated monomer having one acid functional group; and about 2 to about 20 percent by weight of an ethylenically unsaturated oligomeric monomer having a number average molecular weight of about 1500 to about 4000 and which is derived from a hydroxyl functional acid having a predominantly hydrocarbon chain of from about 10 to 19 carbon atoms. Note that the percentages by weight are based upon the total solid weight of reactants used to prepare the copolymer.

DETAILED DESCRIPTION

The copolymer reaction product used in the coating composition of the present invention, hereinafter referred to as "copolymer" is non-gelled. By "non-gelled", it is meant that the copolymer is substantially free from crosslinking and the copolymer has a measurable intrinsic viscosity when dissolved in a suitable solvent. In contrast, a gelled resin, having an essentially infinite molecular weight, would have an intrinsic viscosity too high to measure.

The copolymer mentioned above used in the coating (i.e., film-forming) compositions of the present invention may be prepared by reacting ethylenically unsaturated monomers ("reactants") via free radical initiated addition polymerization techniques.

Any conventional unsubstituted or hydroxyl functional aliphatic or aromatic ethylenically unsaturated monomers may be used to prepare the copolymer as known by those skilled in the art, provided they do not cause or contribute to the formation of a gelled copolymer during copolymerization. By "unsubstituted", it is meant not substituted with any groups reactive with hydroxyl or acid, nor substituted with any interreactive groups which could lead to the formation of a gelled copolymer. Such reactive groups include epoxy, alkoxysilane, amino, amido, or isocyanato. Examples of suitable monomers include vinyl aromatic monomers such as styrene, alpha-methyl styrene, and tertiary butyl styrene; vinyl aliphatic monomers such as ethylene, propylene, and 1,3-butadiene; and alkyl esters of acrylic and methacrylic acid having from 1 to 17 carbon atoms in the alkyl group, including methyl (meth)acrylate, ethyl (meth)acrylate, butyl (meth)acrylate, cyclohexyl (meth)acrylate, 2-ethylhexyl (meth)acrylate, isobornyl (meth)acrylate and lauryl (meth) acrylate. The ethylenically unsaturated monomers are typically present in the copolymer at about 75 to 95 percent total by weight, preferably 80 to 95 percent total by weight, based upon the total solid weight of reactants used to prepare the copolymer.

Preferably, the ethylenically unsaturated monomer present in the copolymer used in the coating composition of the present invention is selected from the group consisting of methyl methacrylate, butyl acrylate, butyl methacrylate, styrene, and mixtures thereof. More preferably, the ethylenically unsaturated monomer is a mixture of methyl methacrylate, butyl acrylate, and styrene, wherein the methyl methacrylate is present at about 40 to about 50 percent by weight, the butyl acrylate is present at about 25 to 30 percent by weight, and the styrene is present at about 5 to about 7 percent by weight. The percentages by weight are based upon the total solid weight of reactants used to prepare the copolymer. These monomers are preferred because they produce a copolymer with a glass transition temperature that allows for the use of the copolymer in coating compositions with a wide variety of applications.

The copolymer further includes 2 to 12 percent by weight, preferably 4 to 8 percent by weight of an ethylenically unsaturated monomer having one acid functional group, based upon the total solid weight of reactants used to prepare the copolymer. Examples of suitable ethylenically unsaturated monomers having one acid functional group include acrylic acid, methacrylic acid, and crotonic acid. Acrylic acid is preferred. Again, as with the ethylenically unsaturated monomer, this acid functional monomer is present in the copolymer through addition-type polymerization known to those skilled in the art.

The copolymer further includes 2 to 20 percent by weight, preferably 7 to 15 percent by weight of an ethylenically unsaturated oligomeric monomer which is derived from a hydroxyl functional acid having a predominantly hydrocarbon chain of from about 10 to 19 carbon atoms. Preferably, the chain is a hydrocarbon chain and the hydroxyl functional acid monomer is 12-hydroxystearic acid. The preparation of this oligomeric monomer is described in more detail below.

The ethylenically unsaturated oligomeric monomer generally has a number average molecular weight of 1500 to 4000, preferably about 2000. Such oligomeric monomers may be prepared, for example, by condensation reactions yielding a polyester or polyether. Hydroxyl functional acids such as 12-hydroxystearic acid may be homopolymerized and the resulting acid functional polyester (poly-(12-hydroxystearic acid)) may be reacted with an ethylenically unsaturated monomer such as a monoepoxy group-containing polymerizable unsaturated compound such as glycidyl acrylate or glycidyl methacrylate, allyl glycidyl ether, (3,4-epoxycyclohexyl)methyl acrylate and the like. Alternatively, a hydroxy fatty acid such as 12-hydroxystearic acid may be copolymerized with a saturated mono- or diacid having a hydrocarbon chain of from about 10 to 19 carbon atoms and the resulting polyester may be reacted with an ethylenically unsaturated monomer such as glycidyl acrylate or glycidyl methacrylate. Examples of suitable saturated mono- or diacids having a hydrocarbon chain of from about 10 to 19 carbon atoms include isodecanoic acid, lauric acid, hexadecanoic acid, dodecanedioic acid, and stearic acid.

The resulting ethylenically unsaturated oligomeric monomer is later reacted with the ethylenically unsaturated monomers described above so as to form the copolymer used in the coating composition of the present invention. It is understood that the quantities of the monomers employed to prepare the copolymer are selected from the aforementioned ranges and the total of all the monomers equals 100 weight percent.

In another embodiment, hydroxyl functional acids having a hydrocarbon chain of from about 16 to 19 carbon atoms may be reacted with an ethylenically unsaturated acid having from about 10 to 19 carbon atoms. The unsaturated acid is preferably monounsaturated. Examples of unsaturated acids include oleic acid and linolenic acid. The resulting ethylenically unsaturated oligomeric monomer is later reacted with the ethylenically unsaturated monomers described above so as to form the copolymer used in the coating composition of the present invention. In this embodiment, the hydroxyl functional acid should be in substantial stoichiometric excess relative to the unsaturated acid in order to prevent formation of a microgel during the subsequent copolymer production. Preferably, the resulting ethylenically unsaturated oligomeric monomer has on average about 0.7 to 1 unsaturated groups per molecule.

In a preferred embodiment of the invention, stearic acid is reacted with 12-hydroxystearic acid in a 1 to 5 mole ratio, and the resultant acid functional polyester is reacted with glycidyl methacrylate in a 1 to 1 mole ratio to produce an ethylenically unsaturated oligomeric monomer.

In a particularly preferred embodiment of the invention, 12-hydroxystearic acid is homopolymerized and the resultant acid functional polyester is reacted with glycidyl methacrylate in a 1 to 1 mole ratio to produce an ethylenically unsaturated oligomeric monomer.

The copolymer used in the coating composition of the present invention may further include up to 10 percent by weight, based upon the total solid weight of reactants used to prepare the copolymer, of a hydroxyl functional ethylenically unsaturated monomer selected from the group consisting of hydroxypropyl (meth)acrylate, hydroxyethyl (meth)acrylate, and hydroxybutyl (meth)acrylate.

A particularly preferred copolymer comprises 49 (+/−5) percent methyl methacrylate, 27 (+/−2) percent butyl acrylate, 6 (+/−1) percent styrene, 4 (+/−1) percent acrylic acid, and 14 (+/−2) percent ethylenically unsaturated oligomeric monomer which is derived from a hydroxyl functional acid having a hydrocarbon chain of from about 15 to 19 carbon atoms.

The copolymers of the present invention can be prepared by free radical initiated addition polymerization of a mixture of the reactants by organic solution polymerization techniques generally known to those skilled in the art. One suitable method is to dissolve the reactants in an organic solvent or mixture of solvents including ketones such as methyl ethyl ketone, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 110° C. to 160° C., and a mixture of reactants and free radical initiator is slowly added to the refluxing solvent, over a period of about 1 to 5, preferably 1 to 3 hours. Adding the reactants too quickly may cause poor conversion or a high and rapid exotherm, which is a safety hazard. Suitable free radical initiators are those typically used in the art such as t-amyl peroxyacetate, which is preferred, di-t-amyl peroxyacetate, di-t-amyl peroxide, and 2,2,'-Azobis(2-methylbutanenitrile). The free radical initiator is typically present in the reaction mixture at about 2 to 10 percent, based on total weight of the reactants.

The copolymer prepared by the above-described technique is non-gelled or ungelled and has a weight average molecular weight of around 7,000 to around 18,000, preferably around 8,000 to 16,000. This technique yields a product with a relatively high solids content (at least about 60 weight percent solids).

The copolymer prepared by the techniques described above may be used in aqueous-based film-forming compositions. Acid groups in the copolymer may be neutralized with amines and the copolymer dispersed in water for use in aqueous-based film-forming compositions. By "aqueous based", it is meant that the film-forming compositions contain at least about 20 percent by weight water as a carrier, based on total weight of the film-forming composition.

The copolymer prepared as described above may be added to a coating composition at 0.5 to 4.0 percent by weight, preferably 0.5 to 3.0 percent by weight. The percentages by weight are based upon total resin solids in the coating composition.

The waterborne coating composition of the present invention with the copolymer described above further contains up to about 2.1 percent by weight, preferably about 0.5 to about 1.5 percent by weight of a hydrophobic amorphous fumed silica. The percentages by weight are based upon total resin solids in the coating composition. Suitable silicas include colloidal silica which has been partially or totally surface modified through the silanization of hydroxyl groups on the silica particle, thereby rendering part or all of the silica particle surface hydrophobic. Examples of suitable hydrophobic silicas include AEROSIL R972, AEROSIL R812 and AEROSIL R805, all commercially available from Degussa Corporation. A particularly preferred fumed silica is available from Degussa Corporation as AEROSIL R812.

The copolymer and silica may be added to the coating composition separately, or, preferably, the silica may be dispersed in the copolymer by a grinding process using conventional equipment such as high-speed blade mixers, ball mills, or sand mills. If the silica is dispersed in the copolymer, the dispersion may be added to the coating composition at any time during formulation as a rheology control additive mixture. The additive mixture contains an amount of the copolymer in the range of about 50 to 90 percent, preferably about 65 to 70 percent and an amount of about 10 to 50 percent, preferably about 30 to 35 percent by weight of a hydrophobic amorphous fumed silica. The percentages by weight are based upon total weight of solids in the additive mixture. The ratio of the copolymer to the silica is generally in the range of 9:1 to 1:1, preferably about 2:1.

The coating composition generally may contain any polymeric film-forming resin known to those skilled in the art to be suitable in a waterborne coating composition. For instance, suitable polymeric film-forming resins include acrylic polymers and copolymers such as acrylic polyol polymers, polyacrylourethanes, and polyacrylesters; polyester polymers and copolymers such as polyesterurethanes and polyester polyol polymers; and polyurethane polymers and copolymers such as polyetherurethanes and the like. Also, water-soluble acrylic and/or polyester resin binder systems known to those skilled in the art of waterborne coatings can be used, including "hybrid" binder systems of waterborne topcoats. These include combinations of water-soluble resins with aqueous dispersion resins. An example is the combination of Synthacryl 6483 (a commercial acrylic dispersion) with Synthacryl 6484 (a commercial water soluble acrylic resin). Other examples are described in U.S. Pat. Nos. 3,919,154; 3,953,644; 4,518,724; and 4,624,973, all of which are hereby incorporated by reference. The preferred polymeric film-forming resin is an acrylic-based binder system having a water-soluble acrylic resin which has been modified with a monofunctional isocyanate compound. This modification may occur with the monofunctional isocyanate compound, for example, by (1) reacting the resin directly with the monofunctional isocyanate compound, or (2) reacting a hydroxyacrylic monomer with the monofunctional isocyanate compound, then (co)polymerizing the resulting urethane modified monomer, to produce the water-soluble resin. Such acrylic-based binder systems are disclosed in U.S. Pat. No. 5,098,947, incorporated herein by reference for its teaching at column 2, line 30, through column 7, line 17. Most preferably, the polymeric film-forming resin is the reaction product of a monofunctional isocyanate compound with a water-soluble acrylic resin. This reaction product can be produced from a monofunctional isocyanate reacted with the polymerization product of one or more hydroxyacrylic monomers and/or the copolymerization of one or more hydroxyacrylic monomers with one or more other olefinically unsaturated monomers. The monofunctional isocyanate compound is typically a monoisocyanate compound of the general formula (I) R—NCO, wherein R is a $C_8$–$C_{25}$ alkyl group. The monofunctional isocyanate compound may alternatively be a partially capped polyisocyanate, which can be reacted with a hydroxyl functional acrylic resin to yield a resin having capped isocyanate groups appended thereto, and the capped isocyanate groups can be subsequently deblocked for curing of the film-forming resin.

The water-soluble acrylic resin typically has an average molecular weight (Mn) of from 500 to 20,000, a hydroxyl number of from 10 to 400, and an acid value of from 5 to 150. Such a polymeric film-forming resin can be present in the coating composition of the present invention in an amount which is generally in the range from about 50 to 85 percent, preferably about 50 to 70 percent by weight based on the total weight of resin solids in the coating composition.

The coating composition may also contain a curing agent for the binder. Such curing agents include, for example, capped polyisocyanates, aminoplasts, and mixtures thereof. Preferred aminoplasts are amino resins containing N-methylol groups and/or N-methylol ether groups. Such amino resins are obtained by reacting an aldehyde, such as formaldehyde, with a compound containing amino groups or amide groups such as melamine, urea, N,N'-ethylene diurea, dicyandiamide and benzoguanamine. These afore-described compounds may be entirely or partly etherified with alcohols having 1 to 6 carbon atoms, for instance with methanol, ethanol, n-propanol, isopropanol, n-butanol, isobutanol, amyl alcohol, hexanol or mixtures of the alcohols referred to above. Use can be made of a methylol melamine containing 4 to 6 methylol groups per molecule of melamine, at least 3 methylol groups being etherified with methanol, ethanol, a propanol or a butanol, or a butanol-etherified condensation product of formaldehyde and N,N'-ethylene diurea. More particularly, use can be made of a hexaalkoxymethyl melamine whose alkoxy group contains 1 to 4 carbon atoms.

The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol or phenolic compound may be used as a capping agent for the capped polyisocyanate curing agent in the coating composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol.

Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and amines such as dibutyl amine.

The curing agent is typically present in the coating composition in amounts of about 15 to 50, preferably about 30 to 50 percent by weight based on the total weight of resin solids.

Other optional ingredients, such as plasticizers, antioxidants, UV light absorbers and stabilizers, may be formulated into the coating composition in a known manner. When used, these ingredients are present (on an individual basis) in amounts up to 10 percent, preferably from about 0.1 to 5 percent by weight based on total weight of resin solids of the composition. Preferably, the other ingredients in the coating composition of the present invention include those of the waterborne film-forming composition disclosed in U.S. Pat. No. 5,098,947, incorporated herein by reference for its teachings of other ingredients at column 7, line 17 through column 8, line 45.

The coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying by either manual or automatic methods can be used.

The coating compositions can be applied over virtually any substrate including wood, metals, glass, cloth plastic, foam, including elastomeric substrates and the like. They are particularly useful in applications over metals and elastomeric substrates that are found on motor vehicles.

The film-forming composition of the present invention is preferably used as the clear coat layer in a "color-plus-clear" coating system. When the waterborne coating composition is used as part of a color-plus-clear composite coating, a colored film-forming composition is applied to a substrate as a base coat, and a film of the base coat is formed on the substrate. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003 and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat also contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent, i.e., organic solvent or water, out of the base coat film by heating or by an air-drying period. Preferably, heating will only be for a short period of time, sufficient to ensure that the topcoat can be applied to the base coat without the former dissolving the base coat composition. Suitable drying conditions will depend on the particular base coat composition and on the ambient humidity with certain water-based compositions, but, in general, a drying time of from about 1 to 5 minutes at a temperature of about 80° F. to 250° F. (20° C. to 121° C.) will be adequate to ensure that mixing of the two coats is minimized. At the same time, the base coat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 0.5 to 10 minutes.

The clear top coat composition is applied to the base coat by any of the conventional coating techniques mentioned above, with spray applications preferred. During application of the coating compositions to the substrate, ambient relative humidity may range from about 30 to about 80 percent, preferably about 50 to 70 percent. The thickness of the coating is usually from about 0.5 to 5 mils (12.7 to 127 microns), preferably 1.0 to 3 mils (25.4 to 76.2 microns). The two coatings are then heated to conjointly cure both coating layers. In the curing operation, solvents are driven off and the film-forming materials of the clear coat and the base coat are each crosslinked. The heating or curing operation is usually carried out at a temperature in the range of from 160° F. to 350° F. (71° C. to 177° C.) but if needed, lower or higher temperatures may be used as necessary to activate crosslinking mechanisms. Note that when the coating composition of the present invention is used as a monocoat, the same curing conditions are suitable.

The coating compositions of the present invention have excellent appearance properties. Sagging and popping are significantly improved through the use of the waterborne coating compositions of the present invention, whether as a monocoat or as a clear coat in a color-plus-clear composite coating.

The invention will be further described by reference to the following examples. Unless otherwise indicated, all parts are by weight.

The following examples (A–D) illustrate the preparation of acrylic copolymers containing various levels of poly-12-hydroxystearic acid methacrylate (PHSAMA).

EXAMPLE A

An acrylic copolymer which contained 14.6 percent by weight PHSAMA based on the total solid weight of reactants used to prepare the copolymer was prepared from the following ingredients:

| Ingredients | Weight (grams) | Percent (solids) by weight |
|---|---|---|
| Methyl methacrylate | 576.0 | 44.7 |
| Butyl acrylate | 353.1 | 27.3 |
| PHSAMA[1] | 188.2 | 14.6 |
| Styrene | 68.3 | 5.5 |
| Acrylic acid | 103.1 | 8.0 |
| LUPERSOL 555M60[2] | 57.1 | 0 |

[1] Oligomeric monomer was prepared by condensing 6 moles of 12-hydroxystearic acid, followed by the reaction of the terminal acidic group with 1 mole of glycidyl methacrylate. The resulting product had an acid value less than 0.5.
[2] t-amyl peracetate (60% in odorless mineral spirits available from Atochem Inc.)

Propylene glycol monomethyl ether in an amount of 316.8 grams was charged to a suitable reactor and heated to reflux. The methyl methacrylate, butyl acrylate, PHSAMA, styrene, and acrylic acid were mixed together to form a premixture of the vinyl monomer feed. The LUPERSOL 555M60, a free radical initiator, and 258 grams of propylene glycol monomethyl ether were also mixed together to form a premixture of initiator. The premixture of initiator was added to the reactor over 3.5 hours. Fifteen minutes after the start of the initiator feed, the premixture of the vinyl monomers was added to the reactor over three hours. Upon the completion of the initiator feed, the contents of the reactor were held for one hour. The reaction product was then cooled to a room temperature. The product had a solids content of about 68 percent and a weight average molecular weight of about 13,000.

EXAMPLE B

An acrylic copolymer was prepared as in Example A, except that the percentages by weight of butyl acrylate, PHSAMA, and styrene were 30.7, 7.0, and 12.0 percent, respectively, based on the total solid weight of reactants used to prepare the copolymer. The product had a solids content of about 68 percent and a weight average molecular weight of about 13,000.

EXAMPLE C

An acrylic copolymer was prepared as in Example A, except that the percentages by weight of butyl acrylate, PHSAMA, and styrene were 30.7, 3.8, and 15.2 percent, respectively, based on the total solid weight of reactants used to prepare the copolymer. The product had a solids content of about 68 percent and a weight average molecular weigh of about 11,000.

EXAMPLE D

An acrylic copolymer which contained 14.0 percent by weight PHSAMA and 4 percent by weight acrylic acid was prepared in the same way as in Example A, except that the percentage of the acrylic acid was reduced to 4 percent and adjusted on methyl methacrylate. The product had a solids content of about 68 percent and weight average molecular weight of about 16,000.

The following examples (E—H) illustrate the preparation of rheology control additives in accordance with the present invention used in the formulation of coating compositions of the present invention. In each of the examples, the solvent and the polymer were combined in a stainless steel beaker and the silica sifted into the mixture under agitation using a cowles blade until all of the silica was incorporated. A double-disk agitator was then used and a charge of about 2000 grams Zircoa grinding media added. The sample was ground for 30 to 60 minutes to a Hegman reading of 7.5 to 8. The resulting dispersion was filtered from the grinding media with a brass filter cone.

EXAMPLE E

A rheology control additive was prepared from the following ingredients:

| Ingredient | Weight (grams) | Solids (grams) |
|---|---|---|
| BUTYL CARBITOL[1] | 311.7 | — |
| AEROSIL R 812[2] | 53.5 | 53.5 |
| Copolymer of Example A | 147.1 | 100.0 |

[1] Diethylene glycol monobutyl ether available from Union Carbide Chemicals and Plastics Co., Inc.
[2] Fumed silica, available from Degussa Corporation.

EXAMPLE F

A rheology control additive was prepared from the following ingredients:

| Ingredient | Weight (grams) | Solids (grams) |
|---|---|---|
| BUTYL CARBITOL | 256.4 | — |
| AEROSIL R 812 | 53.5 | 53.5 |
| Copolymer of Example B | 147.0 | 100.0 |

EXAMPLE G

A rheology control additive was prepared from the following ingredients:

| Ingredient | Weight (grams) | Solids (grams) |
|---|---|---|
| BUTYL CARBITOL | 244.8 | — |
| AEROSIL R 812 | 53.5 | 53.5 |
| Copolymer of Example C | 146.4 | 100.0 |

EXAMPLE H

A rheology control additive was prepared from the following ingredients:

| Ingredient | Weight (grams) | Solids (grams) |
|---|---|---|
| BUTYL CARBITOL | 284.5 | — |
| AEROSIL R 812 | 53.5 | 53.5 |
| Copolymer of Example D | 148.6 | 100.0 |

The following examples (1–5) illustrate the preparation of various coating compositions.

EXAMPLE 1 (CONTROL)

A waterborne coating composition containing no rheology control additives was prepared by mixing together the following ingredients:

| Ingredient | Weight (grams) | Solids (grams) |
|---|---|---|
| SETALUX C-6101[1] | 88.0 | 65.0 |
| BUTYL CARBITOL | 8.7 | — |
| propylene glycol | 11.9 | — |
| TINUVIN 1130[2] | 1.7 | 1.7 |
| TINUVIN 292[3] | 1.2 | 1.2 |
| DC 2-5555[4] | 0.6 | — |
| 10-10246[5] | 28.5 | 17.1 |
| CYMEL 328[6] | 20.1 | 17.1 |
| N,N-dimethyltrimethylene diamine[7] | 8.5 | — |
| deionized water | 90.0 | — |

[1] Acrylic resin available from AKZO Chemicals, Inc.
[2] Substituted hydroxyphenyl benzotriazole available from Ciba-Geigy Corp.
[3] Bis(1,2,2,6,6-pentamethyl-4-piperidinyl) sebacate hindered amine stabilizer available from Ciba-Geigy Corp.
[4] Ten percent silicone in 2-butoxyethanol available from Dow Corning Corporation.
[5] Blocked isocyanate available from AKZO Chemicals, Inc.
[6] Highly methylated, high imino content waterborne melamine formaldehyde resin available from CYTEC Industries, Inc.
[7] Ten percent amine solution in deionized water.

EXAMPLE 2

A waterborne coating composition containing the rheology control additive of Example E was prepared by mixing together the following ingredients:

| Ingredient | Weight (grams) | Solids (grams) |
|---|---|---|
| SETALUX C-6101 | 88.0 | 65.0 |
| BUTYL CARBITOL | 8.7 | — |
| propylene glycol | 11.9 | — |
| TINUVIN 1130 | 1.7 | 1.7 |
| TINUVIN 292 | 1.2 | 1.2 |
| DC 2-5555 | 0.6 | — |
| 10-10246 | 28.5 | 17.1 |
| CYMEL 328 | 20.1 | 17.1 |
| Rheology control additive of Example E | 10.0 | 3.0 |
| N,N-dimethyltrimethylene diamine | 8.5 | — |
| deionized water | 90.0 | — |

EXAMPLE 3

A waterborne coating composition was prepared as in Example 2, except that the 3.0 solid grams of the rheology control additive of Example E was replaced with 2.2 solid grams of the rheology control additive of Example F.

EXAMPLE 4

A waterborne coating composition was prepared as in Example 2, except that the 3.0 solid grams of the rheology control additive of Example E was replaced with 2.2 solid grams of the rheology control additive of Example G.

EXAMPLE 5

A waterborne coating composition was prepared as in Example 2, except that the 3.0 solid grams of the rheology control additive of Example E was replaced with 2.2 solid grams of the rheology control additive of Example H.

Each of the coating compositions of Examples 1–5 were reduced in viscosity to 30 seconds (#4 DIN flow cup at 75° F. (23.9° C.)) with deionized water before spray application. These coatings were applied as clearcoats over a waterborne black pigmented basecoat available from PPG Industries, Inc., as 32-09005, which was reduced in viscosity to 30 seconds (#4 DIN flow cup at 75° F. (23.9° C.)) with deionized water before spray application. The substrate panels were cold rolled steel electrocoated with a composition available from PPG industries, Inc., as ED5000.

The basecoat was applied in two coats to the panels. After applying the second coat, the panels were flashed at 80° C. for ten minutes before the clearcoat application. The clearcoat was applied in three coats. The clear coated panels were then subjected to a 3-minute ambient flash, followed by a 10-minute heated flash at 60° C. and 25 minutes at 140° C. for curing. For each clearcoat example, there was one panel in the horizontal position and one panel in the vertical position. The properties of the cured coating compositions are reported in Table I below.

TABLE I

| Example | Pop resistance[1] | Sag resistance[2] |
|---|---|---|
| 1 (Control) | 9 | 10 |
| 2 | 3 | 2 |
| 3 | 4 | 3 |
| 4 | 6 | 6 |
| 5 | 2 | 1 |

[1] Pop resistance was determined by visual observation. A rating of 0 indicates no popping while a rating of 10 indicates severe edge pop and popping throughout the surface of a panel.
[2] Sag was measured from the bottom of a prepunched hole 8 mm in diameter, located ½ inch (1.27 cm) from the top of the The data reported in Table I indicate that sag and popping are much lower for panels coated with compositions containing rheology control additives than for the control which contained no rheology control additive.

We claim:

1. A waterborne coating composition comprising a polymeric film-forming resin; up to about 2.1 percent by weight, based on the total weight of resin solids, of a hydrophobic amorphous fumed silica; and about 0.5 to about 4.0 percent by weight, based on the total weight of resin solids, of a non-gelled copolymer; wherein the non-gelled copolymer comprises a reaction product of:

about 75 to about 95 percent by weight based upon the total solid weight of reactants used to prepare the copolymer of at least one ethylenically unsaturated unsubstituted or hydroxyl functional aliphatic or aromatic monomer;

about 2 to about 12 percent by weight based upon the total solid weight of reactants used to prepare the copolymer of an ethylenically unsaturated monomer having one acid functional group; and about 2 to about 20 percent by weight based upon the total solid weight of reactants used to prepare the copolymer of an ethylenically unsaturated oligomeric monomer having a number average molecular weight of about 1500 to about 4000 and which is derived from a hydroxyl functional acid having a predominantly hydrocarbon chain of from about 10 to 19 carbon atoms.

2. The waterborne coating composition of claim 1 wherein the ethylenically unsaturated unsubstituted or hydroxyl functional aliphatic or aromatic monomer is an alkyl ester of acrylic acid or methacrylic acid with an alkyl group having from about 1 to 17 carbon atoms.

3. The waterborne coating composition of claim 1 wherein the ethylenically unsaturated monomer is selected from the group consisting of methyl methacrylate, butyl acrylate, butyl methacrylate, styrene, and mixtures thereof.

4. The waterborne coating composition of claim 3 wherein the ethylenically unsaturated monomer is a mixture comprising about 40 to about 50 percent by weight methyl methacrylate; about 25 to about 30 percent by weight butyl acrylate; and about 5 to about 7 percent by weight styrene; wherein the percentages by weight are based upon the total solid weight of reactants used to prepare the copolymer.

5. The waterborne coating composition of claim 1 wherein the ethylenically unsaturated monomer having one acid functional group is selected from the group consisting of acrylic acid and methacrylic acid.

6. The waterborne coating composition of claim 1 wherein the ethylenically unsaturated oligomeric monomer derived from a hydroxyl functional acid has on average about 0.7 to 1 unsaturated groups per molecule.

7. The waterborne coating composition of claim 1 wherein the hydroxyl functional acid is 12-hydroxystearic acid.

8. The waterborne coating composition of claim 1 wherein the hydrophobic amorphous fumed silica is present at from about 0.5 to about 1.5 percent by weight, based on the total weight of resin solids.

9. The waterborne coating composition of claim 1 wherein the non-gelled copolymer is present at from about 0.5 to about 3.0 percent by weight, based on the total weight of resin solids.

10. The waterborne coating composition of claim 1 wherein the non-gelled copolymer further includes up to 10 percent by weight, based upon the total solid weight of reactants used to prepare the copolymer, of a hydroxyl functional ethylenically unsaturated monomer selected from the group consisting of hydroxypropyl (meth)acrylate, hydroxyethyl (meth)acrylate, and hydroxybutyl (meth) acrylate.

11. The waterborne coating composition of claim 1 wherein the non-gelled copolymer has a weight average molecular weight of around 7,000 to around 18,000.

12. The waterborne coating composition of claim 1 wherein acid groups in the copolymer are neutralized with amines and the copolymer dispersed in water.

13. The waterborne coating composition of claim 1 wherein the polymeric film-forming resin is present in an amount of about 50 to 85 percent by weight based on the total weight of resin solids in the coating composition.

14. The waterborne coating composition of claim 13 wherein the polymeric film-forming resin is present in an amount of about 50 to 70 percent by weight based on the total weight of resin solids in the coating composition.

15. The waterborne coating composition of claim 1 further comprising a curing agent selected from the group consisting of capped polyisocyanates, aminoplasts, and mixtures thereof.

16. The waterborne coating composition of claim 15 wherein the curing agent is present in an amount of about 15 to 50 percent by weight based on the total weight of resin solids in the coating composition.

17. The waterborne coating composition of claim 16 wherein the curing agent is present in an amount of about 30 to 50 percent by weight based on the total weight of resin solids in the coating composition.

18. A waterborne coating composition comprising a polymeric film-forming resin, about 0.5 to about 1.5 percent by weight, based on the total weight of resin solids, of a hydrophobic amorphous fumed silica; and about 0.5 to about 3.0 percent by weight, based on the total weight of resin solids, of a non-gelled copolymer; wherein the non-gelled copolymer comprises a reaction product of:

about 80 to about 95 percent by weight based upon the total solid weight of reactants used to prepare the copolymer of at least one ethylenically unsaturated monomer selected from the group consisting of methyl methacrylate, butyl acrylate, butyl methacrylate, styrene, and mixtures thereof;

about 4 to about 8 percent by weight based upon the total solid weight of reactants used to prepare the copolymer of an ethylenically unsaturated monomer having one acid functional group; and about 7 to about 15 percent by weight based upon the total solid weight of reactants used to prepare the copolymer of an ethylenically unsaturated oligomeric monomer having a number average molecular weight of about 1500 to about 4000 and which is derived from a hydroxyl functional acid having a predominantly hydrocarbon chain of from about 10 to 19 carbon atoms.

19. The waterborne coating composition of claim 1 wherein the ethylenically unsaturated oligomeric monomer is the reaction product of hydroxyl functional acids having a hydrocarbon chain from about 10 to 19 carbon atoms and of an ethylenically unsaturated acid having from about 10 to 19 carbon atoms, where the hydroxyl functional acid is in stoichiometric excess relative to the unsaturated acid in order to prevent formation of a microgel during formation of any subsequent copolymer.

20. The waterborne coating composition of claim 1 wherein the ethylenically unsaturated oligomeric monomer is the copolymerized reaction product of hydroxyl fatty acid with a compound selected from the group consisting of saturated monoacids and saturated diacids both having a hydrocarbon chain from about 10 to 19 carbon atoms and where the resulting polyester is reacted with an ethylenically unsaturated monomer selected from the group consisting of glycidyl acrylate and glycidyl methacrylate.

21. The waterborne coating composition of claim 1 wherein the ethylenically unsaturated oligomeric monomer is the reaction product of stearic acid and 12-hydroxystearic acid in a 1 to 5 mole ratio, and the resultant acid functional polyester is reacted with glycidyl methacrylate in a 1 to 1 mole ratio.

22. The waterborne coating composition of claim 1 wherein the ethylenically unsaturated oligomeric monomer is the homopolymerized product of 12-hydroxystearic acid to form a resultant acid functional polyester which is reacted with glycidyl methacrylate in a 1 to 1 mole ratio.

* * * * *

UNITED STATES PATENT AND TRADEMARK OFFICE
CERTIFICATE OF CORRECTION

PATENT NO. : 5,703,155

DATED : December 30, 1997

INVENTOR(S) : Swarup, et al.

It is certified that error appears in the above-identified patent and that said Letters Patent is hereby corrected as shown below:

Title page, item [57], Abstract line 12, delete the word "hating" and replace it with --having--.

Signed and Sealed this

Nineteenth Day of January, 1999

Attest:

Attesting Officer

*Acting Commissioner of Patents and Trademarks*